(12) United States Patent
Ikeda

(10) Patent No.: US 7,232,954 B2
(45) Date of Patent: Jun. 19, 2007

(54) MANUFACTURING METHOD OF SHIELDED WIRE HARNESS AND SHIELDED CABLE AND END STRUCTURE THEREOF

(75) Inventor: Kenji Ikeda, Mie (JP)

(73) Assignees: Autonetworks Technologies, Ltd., Yokkaichi-shi (JP); Sumitomo Wiring Systems, Ltd., Yokkaichi-shi (JP); Sumitomo Electric Industries, Ltd., Osaka-shi (JP)

( * ) Notice: Subject to any disclaimer, the term of this patent is extended or adjusted under 35 U.S.C. 154(b) by 107 days.

(21) Appl. No.: 11/073,841

(22) Filed: Mar. 8, 2005

(65) Prior Publication Data

US 2005/0193556 A1 Sep. 8, 2005

(30) Foreign Application Priority Data

Mar. 8, 2004 (JP) ............................ P2004-064355
Jan. 11, 2005 (JP) ............................ P2005-004289

(51) Int. Cl.
*H02G 15/02* (2006.01)
(52) U.S. Cl. .................................. 174/74 R; 174/75 C
(58) Field of Classification Search ............. 174/74 R, 174/74 A, 75 C, 78, 82, 84 R, 86
See application file for complete search history.

(56) References Cited

U.S. PATENT DOCUMENTS

| 4,634,208 A * | 1/1987 | Hall et al. ................... 439/610 |
| 4,854,895 A * | 8/1989 | Komatsu .................... 439/610 |
| 5,409,400 A * | 4/1995 | Davis ......................... 439/610 |
| 5,622,512 A * | 4/1997 | Uchida et al. ............... 439/271 |
| 6,113,429 A * | 9/2000 | Weigel et al. ............... 439/610 |
| 7,064,266 B2 * | 6/2006 | Wada .......................... 439/607 |
| 2003/0216072 A1 * | 11/2003 | Kato et al. ................... 439/157 |

FOREIGN PATENT DOCUMENTS

| CN | A 1180948 | 5/1998 |
| JP | A 5-198342 | 8/1993 |
| JP | A 2002-280132 | 9/2002 |

\* cited by examiner

*Primary Examiner*—William H. Mayo, III
(74) *Attorney, Agent, or Firm*—Oliff & Berridge, PLC

(57) ABSTRACT

A front end of the shielding member clamped between the fastener and the minor diameter part of the connector, and the terminal hardware is connected to the front ends of the wires. After inserting the terminal hardware into the housing, by fitting the connector into the housing, the major diameter part of the connector is connected to the shield shell made of a metal and which shield shell surrounding the terminal hardware in the housing. The front ends of the wires exposed by removing the shielding member is protected in the shielded state by being held in the housing.

6 Claims, 9 Drawing Sheets

MANUFACTURING METHOD OF SHIELDED WIRE HARNESS AND SHIELDED CABLE AND END STRUCTURE THEREOF

BACKGROUND OF THE INVENTION

1. Field of the Invention

The present invention relates to a manufacturing method of a shielded wire harness, a shielded cable and an end structure thereof.

2. Description of the Related Art

As a structure of an end of a shielded cable in which a plurality of wires are surrounded by one shielding member configured by a braided wire, there is a structure of connecting an end of each wire exposed by removing the shielding member to the terminal hardware to hold the wires in a housing, branching a cable formed by stranding an end of the shielding member from a current-carrying path, adhering an end of the branched cable to an earth terminal, and connecting the earth terminal to an earth member such as a body or an apparatus. In an end of a shielded current-carrying path in which a plurality of wires are surrounded by a shielding member being a cylinder form in which the shielding member is configured by a braided wire, a process structure providing an earth circuit which is branched from a current-carrying path is described in JP-A-5-198342 (FIG. 8).

SUMMARY OF THE INVENTION

There is a case that a wire is exposed between an end of a shielding member and a connector, and at this region a shielding property is not ensured.

The present invention has been completed on the basis of these circumstances. It is an object of the invention to ensure a shielding property.

According one aspect of the invention, a manufacturing method of a shielded wire harness when an end of a shielded cable in which a wire is surrounded by a shielding member is connected to a shielded connector, including: outer-fitting a cylindrical fastener onto a shielding member; holding the cylindrical fastener in a rear portion of the shielding member; sliding a boss of a metallic cylindrical connector between an end of the wire and an end of the shielding member; moving the cylindrical fastener forward to clamp an end portion of the shielding member between the cylindrical fastener and the boss; connecting the terminal hardware to the end portion of the wire; inserting the terminal hardware into the housing of the shielded connector; fitting the connector into the housing; and connecting a connection part of the metallic cylindrical connector to a metal shield shell which surrounds the terminal hardware in a housing of the shielded connector.

As a result, a predetermined shield property is ensured, and radiation of noise is lessened.

According to another aspect of the invention, the shielding member is configured by a braided wire. By thus configuration, the operability is excellent.

According to another aspect of the invention, the wire is exposed for a predetermined length from an end portion of the wire by removing the shielding member in the above-manufacturing method.

By thus process, loosening of the shielding member is prevented.

According to another aspect of the invention, the wire is exposed for a predetermined length from an end portion of the wire by deforming the shielding member to shrink in an axis direction before the end portion of the wire connects to the terminal hardware.

By thus process, a process of peeling the exposed end of the wire and crimping and connecting the terminal hardware thereto becomes possible.

According to another aspect of the invention, the wire is exposed for a predetermined length from an end portion of the wire by deforming the shielding member to shrink in an axis direction before the end portion of the wire connects to the terminal hardware.

By thus process, the operability when connecting the terminal hardware to the end of the wire is excellent.

According to another aspect of the invention, an end structure of shielded cable, including: a shielded cable including a wire surrounded by a shielding member; a cylindrical fastener capable of being outer-fitted on the shielding member; a cylindrical metallic connector capable of being outer-fitted on an end portion of the wire; the connector including: a boss capable of clamping an end portion of the shielded member between the cylindrical fastener and the shielded connector; and a connection part connected to a metallic shield shell capable of surrounding terminal hardware connected to the end portion of the wire in a housing of the shielded connector.

The end of the shielding member is clamped between the fastener and the boss of the connector, and the shielding member is connected to the shield shell in the housing easily and with reliability when the connector is installed to the housing.

BRIEF DESCRIPTION OF THE PREFERRED EMBODIMENTS

DESCRIPTION OF THE PROFFERED EMBODIMENTS

First Embodiment

Figure 1:
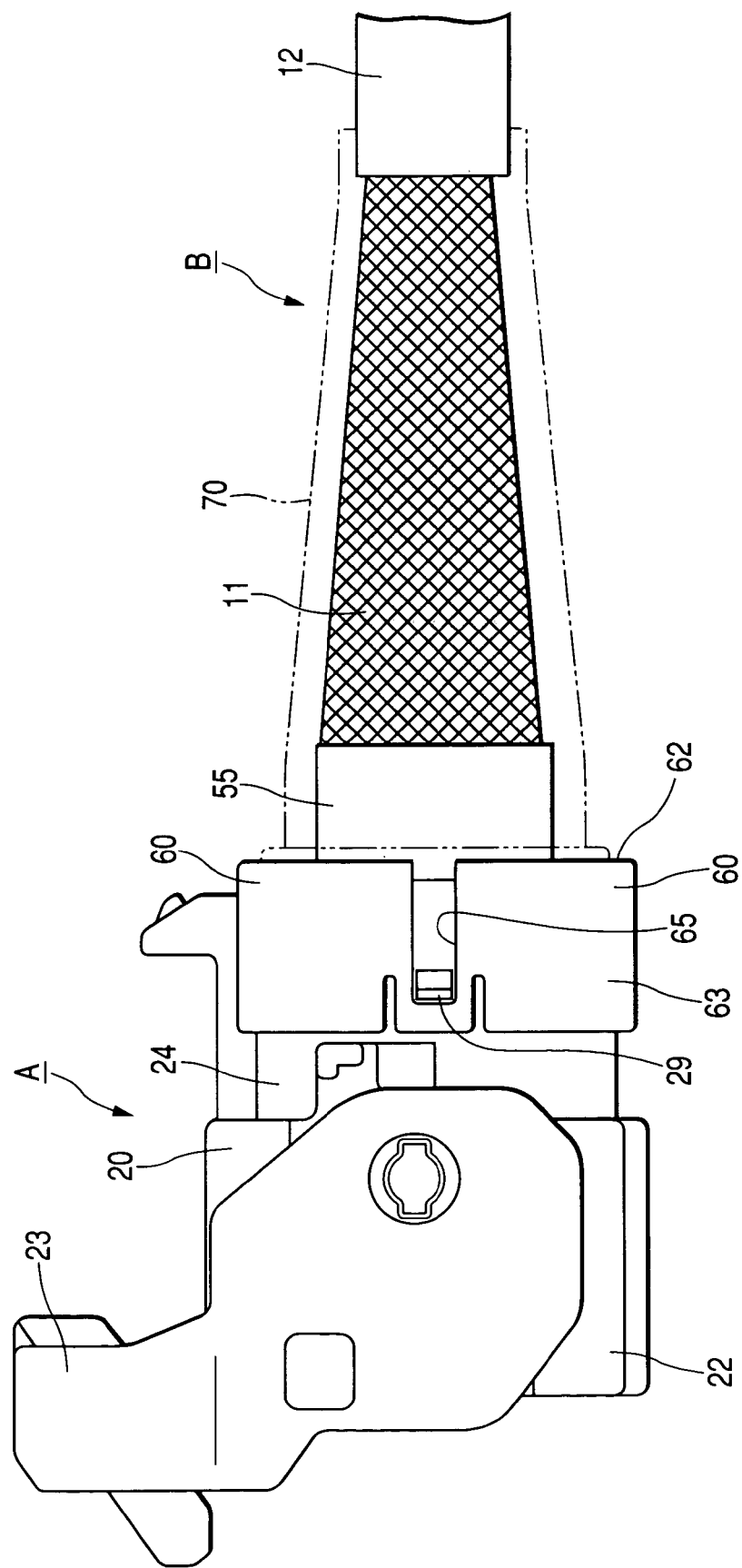
FIG. 1 is a side view of a shielded connector and a shielded cable of an embodiment of the invention.
Figure 2:
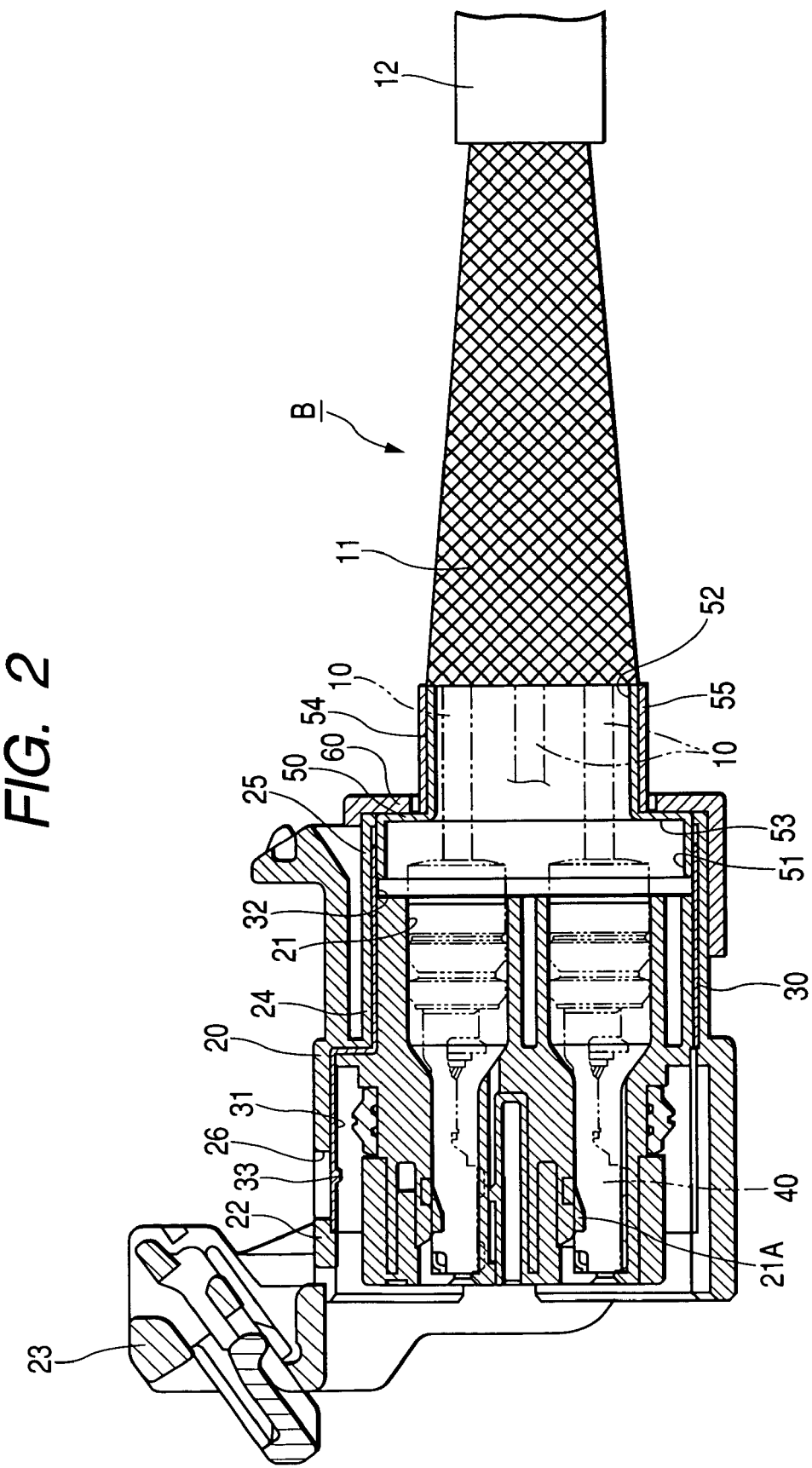
FIG. 2 is a sectional view of the shielded connector and the shielded cable.

A first embodiment of the present invention will be described based on FIG. 1 and FIG. 5. An axis direction is synonymous with a front-to-back direction in the following.

First, a shielded cable B which is a manufacturing object will be described. A plurality of, for example, three wires 10 are surrounded by one tubular shielding member 11 in the shielded cable B. The wires 10 are unshielded wires in which a periphery of the conductor is surrounded by an insulating coating. The shielding member 11 is configured by a braided wire in which a plurality of thin metal wires are braided in a mesh. The shielding member 11 has flexibility extensible in both an axis direction (a length direction) and a diameter direction. The periphery of the shielding member 11 is sheathed with a sheath 12.

Next, a shielded connector A which connects to a front end of the shielded cable B will be described. The shielded connector A comprises a housing 20, terminal hardware 40, a shield shell 30, a connector 50, a fastener 55, and a cover 60.

The housing 20 is made of a synthetic resin, and a plurality of rooms penetrating in the front-to-back direction, for example, a cavity 21 which has three rooms inside the housing 20. In the front half of the housing 20, a hood 22 which is a roughly rectangular tabular form is formed. An outer surface of the hood 22 supports a lever 23 rotatably in which the lever is a gate form on the whole. The lever 23 is used to enhance operability when the housing 20 of the present embodiment fits and connects with a housing of a counterpart (not shown). The rear half of the housing 20 is a fitting part 24 which is a circle in its outer shape. The rear end of the fitting part 24 is a fitting tube 25 which is a circle and extends to the rearward more than the rear end of the cavity 21.

The shield shell 30 which is integrated with the housing 20 by an insert forming when the housing 20 is molded. The front half of the shield shell 30 with a demarcation line of a step is a rectangular tube 31, and the rear half is a cylinder 32. A resilient contact member 33 is formed on predetermined positions of the rectangular tube 31 and the cylinder 32. The shield shell 30 is embedded in the housing 20 along an outer surface of the housing 20, and is disposed and held in a position to lock the housing 20.

The rectangular tube 31 is exposed along an inner radius of the hood 22 and surrounds a plurality of, for example, three pieces of terminal hardware 40 in block for the cavity 21. When the housing 20 is connected to the housing of the counterpart, the resilient contact member 33 of the rectangular tube 31 contacts with resiliency to an earth member (not shown) provided on the periphery of the housing of the counterpart. A drawing hole 26 which is opened to the outer surface is formed on the hood 22, thus the resilient contact member 33 is able to bend in the diameter direction.

On the other hand, the cylinder 32 is provided with the fitting part 24 concentrically to surround in block the cavity 21 and the terminal hardware 40 inside the cavity 21 in the fitting part 24. The rear end of the cylinder 32 is exposed along an inner radius of a fitting tube 25. The resilient contact member of the cylinder 32 (not shown) is provided on the exposed part, and when the connector 50 which will be described later is inserted into the fitting tube 25, the resilient contact member contacts to the connector 50 with resiliency.

The female terminal hardware 40 is adhered to an end of each wire 10. The terminal hardware 40 is inserted into the cavity 21 from the rear, and is placed so as not to be removed by a locking effect of a lance 21A formed along an inner wall of the cavity 21. The wires 10 extended from the rear end of the terminal hardware 40 pass the fitting tube 25 and are lead to the rear of the housing 20.

The connector 50 is a tubular form and made of a metal. The connector 50 connects the shielding member 11 of the shielded cable B to the shield shell 30. About one-third of the front end side in the axis direction of the connector 50 is a major diameter part 51 (which corresponds to the connection part of the embodiment of the present invention) which is a circle, and two-thirds of the rear end side is a minor diameter part 52 (which corresponds to the boss of the embodiment of the present invention) in which the diameter thereof is smaller than that of the major diameter part 51 and which is a concentric circle with the major diameter part 51. The rear end of the major diameter part 51 and the front end of the minor diameter part 52 are connected to each other with a step form via an annular ring 53 which is concentric. In addition, a concave part 54 for swaging in which a center in the axis direction is concave shallowly in the direction of the edge is formed on the periphery of the minor diameter part 52. The major diameter part 51 of the connector 50 connects to the cylinder 32 of the shield shell 30 when the major diameter part 51 is inserted into the fitting tube 25 of the housing 20.

The cover 60 is made of a synthetic resin, and a flange 62 which hangs over an outer direction of the diameter is formed. And a surrounding part 63 is formed to extend toward the front from a peripheral edge of the flange 62. A locking hole 65 to regulate a removal of the cover 60 from the housing 20 is formed on the surrounding part 63.

Next, a process to process an end of the shielded cable B and a process to connect the processed shielded cable B to the shielded connector A will be described in order.

Figure 3A:
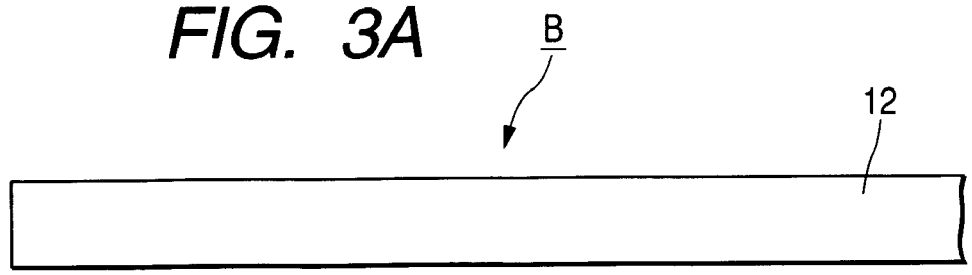
FIG. 3A is a side view of an end of the shielded cable before processing.
Figure 3B:
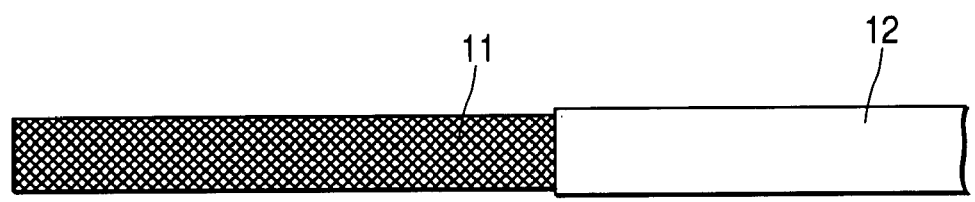
FIG. 3B is a side view when a part of a sheath is removed.

First, from the state shown in FIG. 3A, the sheath 12 on the end (the front end) of the shielded cable B is removed to expose the shielding member 11 for a predetermined length (refer to FIG. 3B). A predetermined length of a front end of the exposed shielding member 11 is removed (or cut) to expose a front end of each wire 10. The cover 60 is outer-fitted onto the shielding member 11 from the front, and is held in a rear position (refer to FIG. 3C). The fastener 55 which is a cylinder form is outer-fitted onto the shielding member 11, and is held in a rear position (refer to FIG. 3D). The fastener 55 is disposed to engage the connector 50 (which will be described later) to be disposed with the same length as the minor diameter part 52 in the axis direction and concentric with the minor diameter part 52.

Figure 4A:
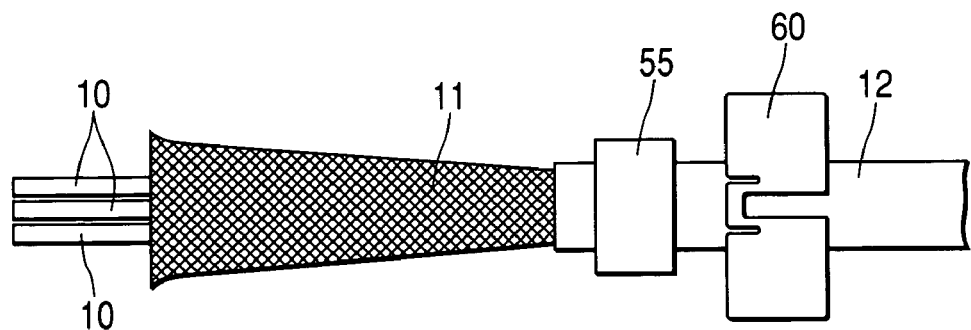
FIG. 4A is a side view when a front end of the shielding member is expanded.
Figure 4B:
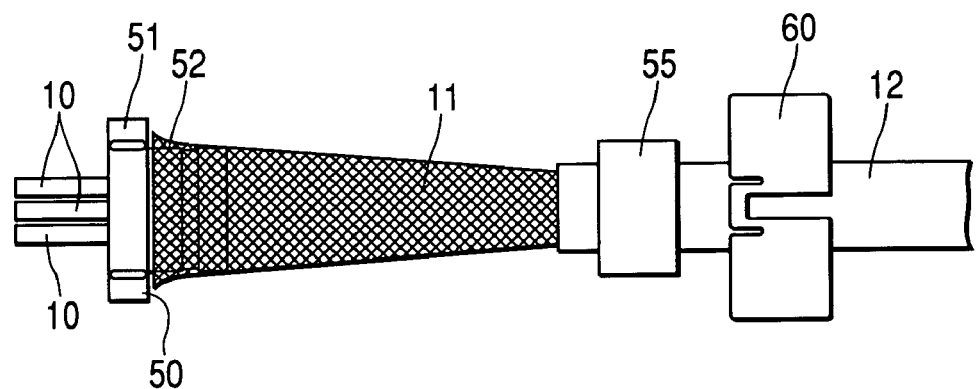
FIG. 4B is a side view when a minor diameter part slides in between the front end of the shielding member and the wires.
Figure 4C:
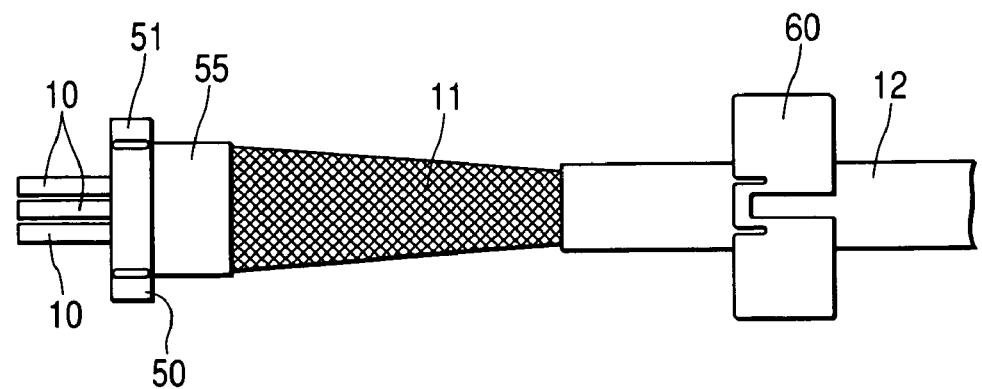
FIG. 4C is a side view when the front end of the shielding member is clamped between the minor diameter part and the fastener.

Next, almost all around of the front end of the shielding member 11 is separated from the peripheral surface of each wire 10 to have a widened diameter (refer to FIG. 4(A)). The connector 50 is outer-fitted onto each wire 10 from the front. The minor diameter part 52 slides in between each wire 10 and the front end of the shielding member 11 with an open state (refer to FIG. 4(B)). After that, the fastener 55 is moved forward so that the front end of the shielding member 11 is sandwiched between the minor diameter part 52 and the fastener 55. With this state, the fastener 55 is swaged to clamp the front end of the shielding member 11 between the minor diameter part 52 and the fastener 55. At this time, the shielding member 11 is hitched by the concave part 54.

Undergoing the above-stated process, three components of the minor diameter part 52 of the connector 50, the front end of the shielding member 11, and the fastener 55 are integrated, and in this integrated state a movement of the connector 50 in the axis direction is allowed while deformation of the shielding member 11 is associated therewith. Thus, the connector 50 is evacuated temporarily to the rear position while the shielding member 11 is deformed to shrink in the axis direction (refer to FIG. 5A). Each wire 10 is exposed for a long length in the axis direction, and the front end of each wire 10 is connected with the terminal hardware 40.

Figure 5A:
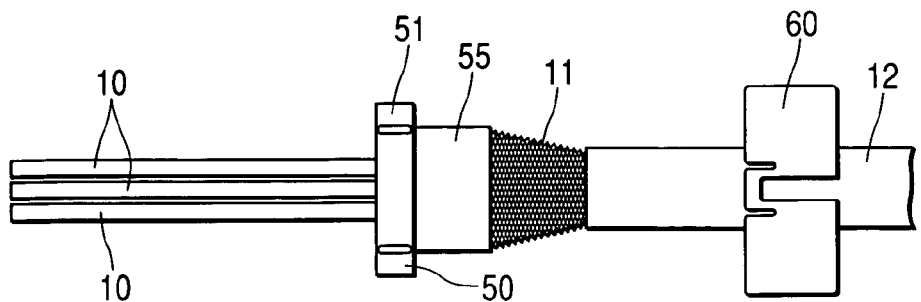
FIG. 5A is a side view when a connector is evacuated to a rear position.
Figure 5B:
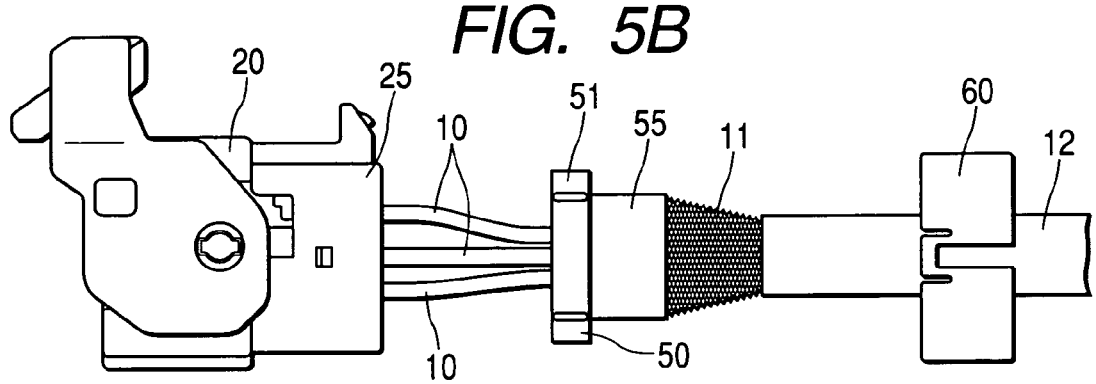
FIG. 5B is a side view when terminal hardware is inserted into a housing.
Figure 5C:
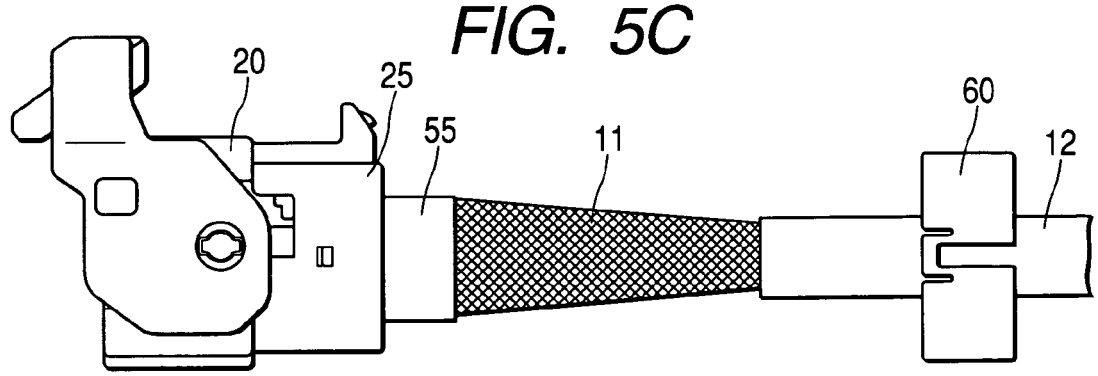
FIG. 5C is a side view when the connector is fitted into the housing.
Figure 5D:
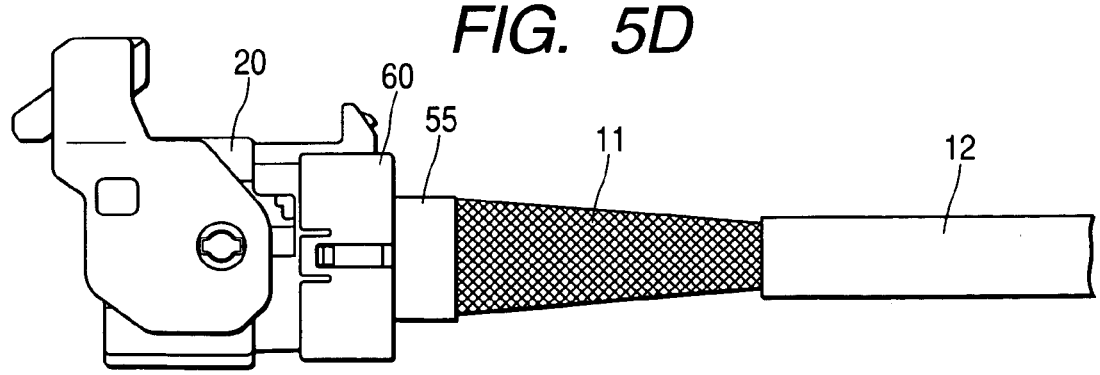
FIG. 5D is a side view when the cover is outer-fitted onto the housing.

To connect the shielded cable B which has finished the end process to the shielded connector A, first, each terminal hardware 40 is inserted into the cavity 21 from the rear (refer to FIG. 5B). Next, the connector 50 is moved forward to insert the major diameter part 51 thereof into the fitting tube 25 of the rear end of the housing 20. At this time, the front end of the major diameter part 51 is butted to the recessed end surface of the fitting tube 25 (a surface that the rear end of the cavity 21 opens) to be stopped. The major diameter part 51 inserted into the fitting tube 25 overlaps in the diameter direction along the inner radius of the cylinder 32 of the shield shell 30 (the periphery of the major diameter part 51 and the inner radius of the cylinder 32 are opposed to each other or contact each other). The resilient contact member of the cylinder 32 contacts the peripheral surface of the major diameter part 51. The connector 50 and the shield shell 30 are connected to each other with continuity. As a result, the shielding member 11 and the shield shell 30 are connected to each other with continuity. Also, the front end of each wire 10 is protected with a shielded state, held in the housing 20.

After that, the cover 60 which is on standby in a rear position is moved forward, and the surrounding part 63 of the cover 60 is installed in the diameter direction to the fitting part 24 of the housing 20 (including the fitting tube 25) without wobbling. When installed correctly, the cover 60 is stopped because the flange 62 thereof is butted to the rear end edge of the fitting tube 25 as well as the cover 60 being installed and held in the housing 20 because the locking hole 65 of the cover 60 is engaged and locked with a locking projection 29 of the housing 20. In a state that the cover 60 is installed, the annular ring 53 of the connector 50 abuts the flange 62 of the cover 60 from the front so that the connector 50 is dislodged backward from the housing 20 is regulated. Inside the fitting tube 25, the major diameter part 51 of the connector 50 can move in the cross direction of the recessed end surface of the fitting tube 25 and the flange 62 of the cover 60.

After installing the cover 60, a rubber boot 70 which was fitted onto the shielded cable B in advance is moved forward to be brought into intimate contact with a circle surrounding part 61 of the cover 60. The rubber boot 70 surrounds the shielding member 11 exposed by the removal of the sheath 12 among the shielded cable B. After installing the rubber boot 70, a rear end of the rubber boot 70 is fitted onto the front end of the sheath 12. From the rear end of the rubber boot 70 over the sheath 12, tape (not shown) is wound to integrate the rear end of the rubber boot 70 and the shielded cable B as well as to have resistance to water by filling crevices between the rear end of the rubber boot 70 and the shielded cable B. Thus, the shielded cable B is connected to the shielded connector A.

As stated above, according to the present embodiment, the connector 50 is inserted into the fitting tube 25 of the housing 20, and the major diameter part 51 of the connector 50 is connected to the shield shell 30. The front end exposed by the removal of the shielding member 11 among each wire 10 is held in the housing 20 and in the connector 50 so that each wire 10 is shielded. As a result, a predetermined shield property is acquired to lessen radiation of noise. Because the front end of the shielding member 11 is removed for a predetermined length in advance, the intervening of the connector 50 and the shield shell 30 does not cause loosening.

After the front end of the shielding member 11 is clamped between the fastener 55 and the minor diameter part 52 of the connector 50, before the connector 50 is inserted into the housing 20, because the connector 50 is evacuated to the rear position while the shielding member 11 is deformed to shrink in the axis direction, the operability to connect the terminal hardware 40 to the front end of each wire 10 is excellent.

Second Embodiment

Next, a second embodiment of the present invention will be explained with reference to FIG. 6 and FIG. 8. The second embodiment is different from the first embodiment that a process to remove the shielding member 11 is not included. However, other aspects are the almost same as the first embodiment.

Figure 6A:
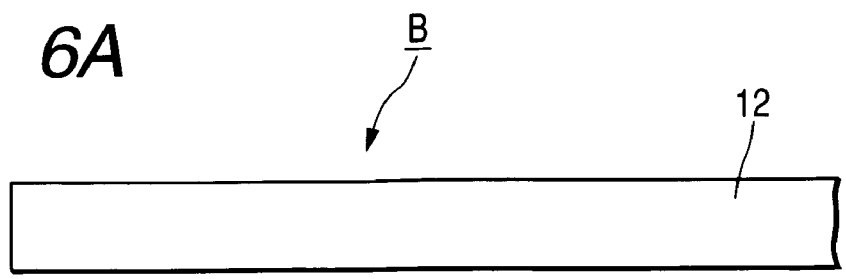
FIG. 6A is a side view of an end of the shielded cable according to a second embodiment.
Figure 6B:
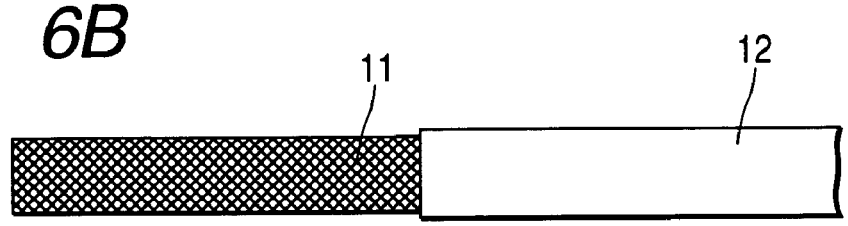
FIG. 6B is a side view when apart of the sheath is removed.
Figure 6C:
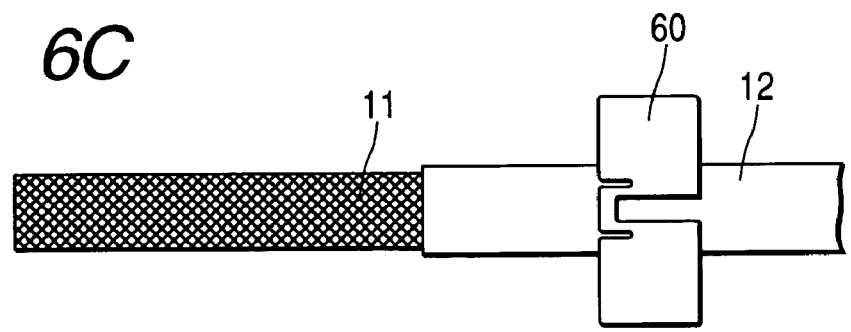
FIG. 6C is a side view when the cover is outer-fitted.
Figure 6D:
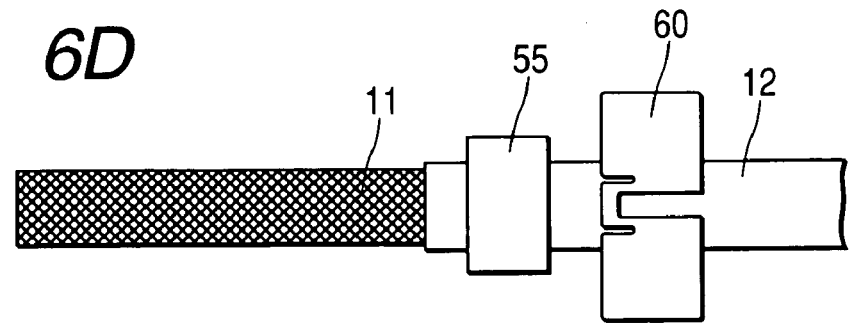
FIG. 6D is a side view when the fastener is outer-fitted.

In the second embodiment, when the end of the shielded cable B is processed, first the sheath 12 is removed to expose the shielding member 11 for a predetermined length (refer to FIG. 6A), and subsequently the cover 60 is outer-fitted from the front and is moved to wait in the rear position without removing the shielding member 11 (refer to FIG. 6B), and furthermore the fastener 55 which is a cylinder form is outer-fitted and is moved to wait in the rear position (refer to FIG. 6C).

Figure 7A:
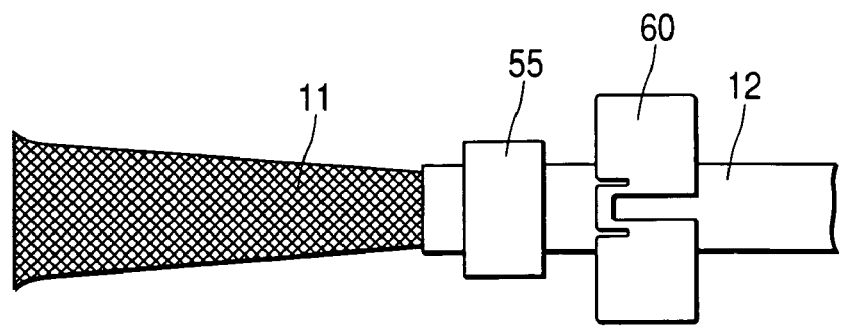
FIG. 7A is a side view when the front end of the shielding member is expanded according to the second embodiment.
Figure 7B:
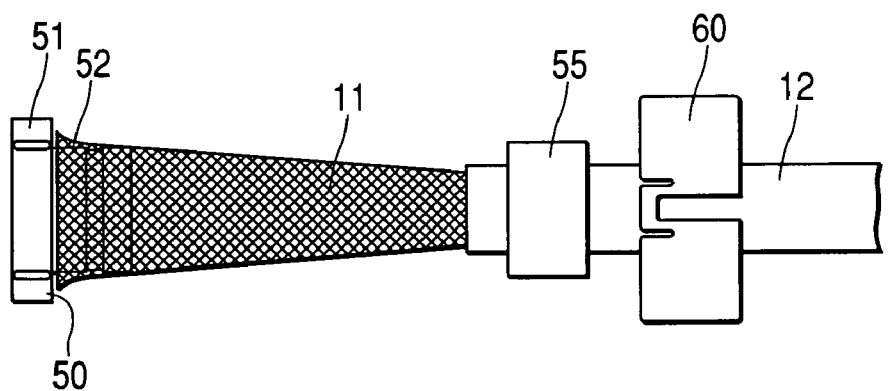
FIG. 7B is a side view when the minor diameter part slides in between the front end of the shielding member and the wires.
Figure 7C:
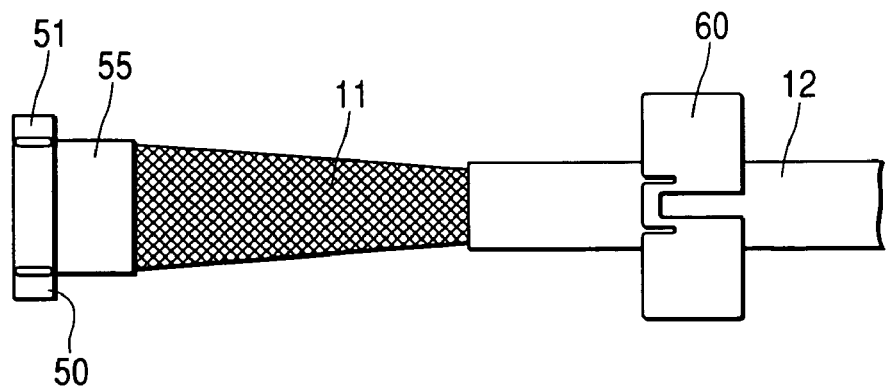
FIG. 7C is a side view when the front end of the shielding member is clamped between the minor diameter part and the fastener.

In a state that the front end (the end part) of the shielding member 11 is opened, the minor diameter part 52 of the connector 50 slides in between the front end of the shielding member 11 and the front end of each wire 10 (refer to FIG. 7B). Next, the fastener 55 is moved forward to sandwich the front end of the shielding member 11 between the minor diameter part 52 and the fastener 55. With this state, the fastener 55 is swaged to clamp the front end of the shielding member 11 between the minor diameter part 52 and the fastener 55 (refer to FIG. 7C).

Figure 8A:
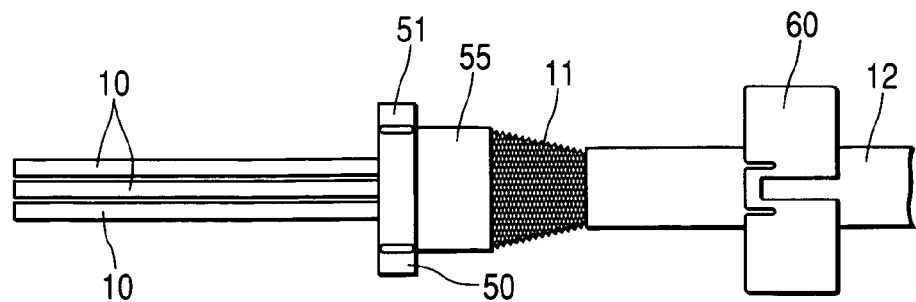
FIG. 8A is a side view when the connector is evacuated to the rear position so that the wires are exposed for a predetermined length from the end according to the second embodiment.
Figure 8B:
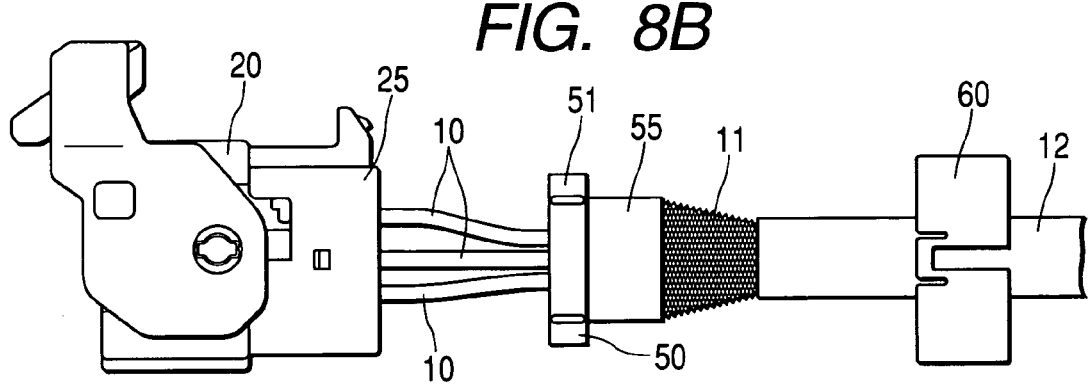
FIG. 8B is a side view when the terminal hardware is inserted into the housing.
Figure 8C:
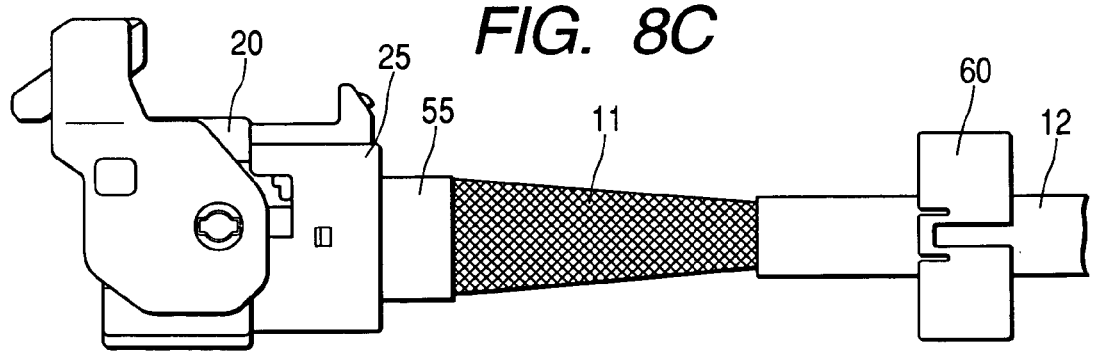
FIG. 8C is a side view when the connector is fitted into the housing.
Figure 8D:
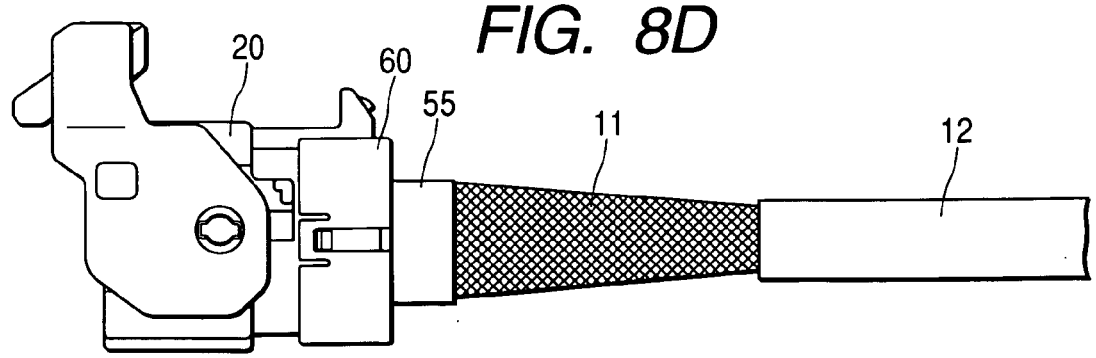
FIG. 8D is a side view when the cover is outer-fitted onto the housing.

With this state, the connector 50 is evacuated to the rear position temporarily while deforming the shielding member 11 to shrink in the axis direction, and the front end of each wire 10 is exposed for a predetermined length in the axis direction (refer to FIG. 8A). Next, after the exposed front end of each wire 10 is peeled and the terminal hardware 40 is swaged thereto, the terminal hardware 40 is inserted into the cavity 21 of the housing 20 from the rear (refer to FIG. 8B). Afterward, the shielded cable B is connected to the shielded connector A with the same process as the process of the first embodiment (refer to FIG. 8C and FIG. 8D).

According to the second embodiment, different from the first embodiment, the process to remove the shielding member 11 is not included so that the work to perform the process can be omitted. Also, even without removal of the shielding member 11, since a predetermined length from the front end of the wires 10 is exposed by deforming the shielding member 11 to shrink in the axis direction, it is possible to perform a process such as crimping and connecting the terminal hardware 40 to the front end of the wires 10. Furthermore, because the shielding member 11 expands and contracts in the axis direction, loosening caused from the intervening of the connector 50 and the shield shell 30 can be absorbed.

Other Embodiments

This invention is not limited to the embodiments described by the above statements and figures, but, for example, the following embodiments are also included in the technical field of the invention. Further, other than the following, various embodiments within the range of the gist of the invention are included.

Figure 9:
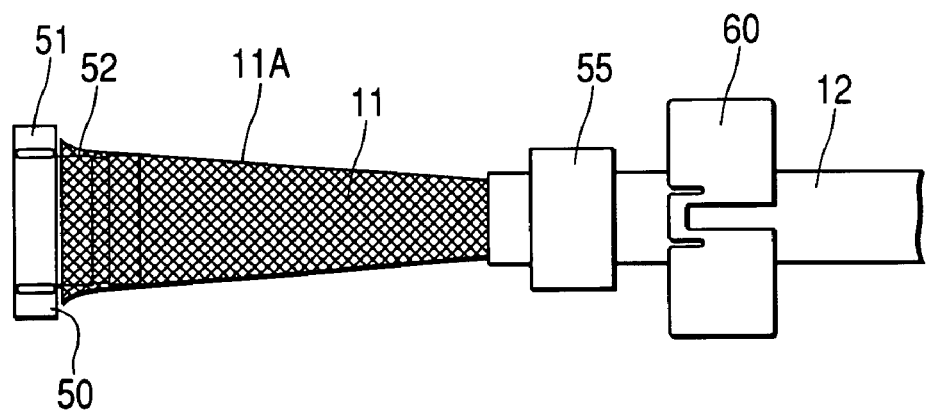
FIG. 9 is a side view when the minor diameter part slides in between the front end of the shielding member and the wires according to another embodiment.

(1) In the above-described embodiments the shielding member 11 is configured by a braided wire, but in the present invention the shielding member 11 may be a shielding wire of a transverse roll type in which a plurality of wires 11A are wrapped around the periphery of the wires 10 as shown in FIG. 9.

Figure 10:
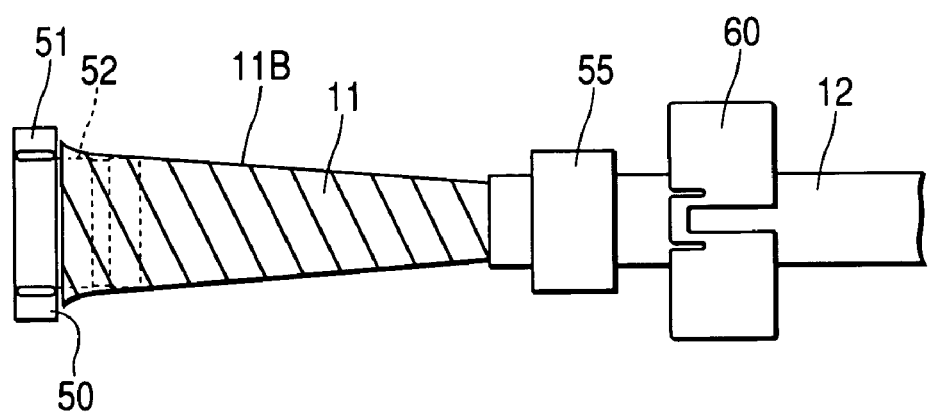
FIG. 10 is a side view when the minor diameter part slides in between the front end of the shielding member and the wires according to still another embodiment.

(2) In addition, in the embodiments of the invention, the shielding member 11 may be configured by wrapping a metal tape 11B such as a metal vapor deposition tape around the periphery of the wires 10 as shown in FIG. 10.

Figure 3C:
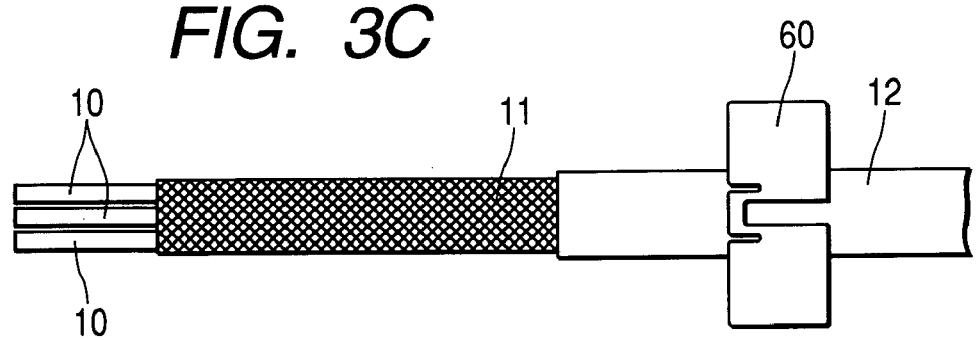
FIG. 3C is a side view when a cover is fitted and a part of a shielding member is removed.
Figure 3D:
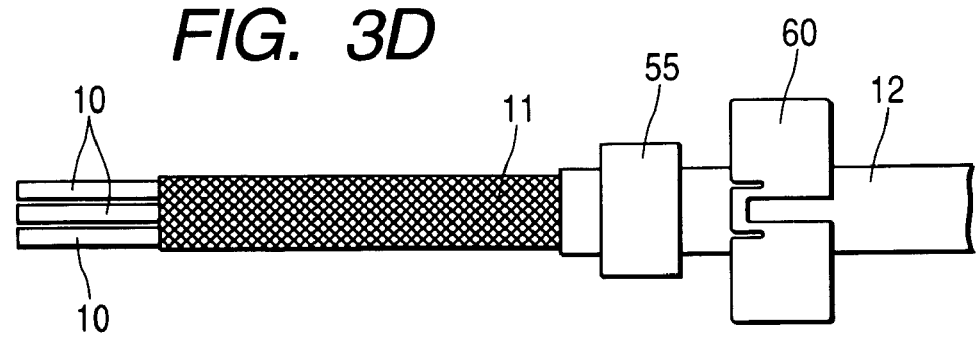
FIG. 3D is a side view when a fastener is outer-fitted.
Figure 11:
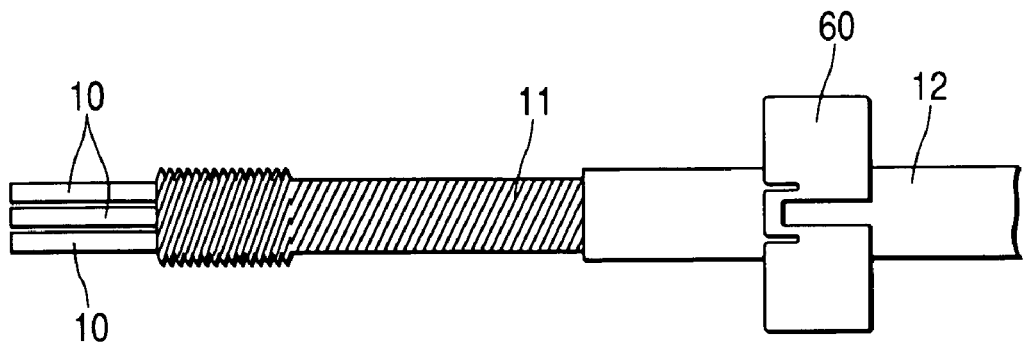
FIG. 11 is a side view when the shielding member shrinks in an axis direction according to still another embodiment.

(3) In the above-described embodiments the shielding member 11 shrinks in the axis direction with the rear movement of the connector 50, but in the invention the requirement is that the shielding member 11 shrinks in the axis direction to expose the front ends of the wires 10 for a predetermined length before the terminal hardware 40 connects to the front ends of the wires 10. Thus, as shown in FIG. 11, for example, the shielding member 11 may shrink without removal of the shielding member 11 before the engagement with the minor diameter part 52 of the connector 50, or as shown in FIG. 3(C), the shielding member 11 may be removed and the terminal hardware 40 may be crimped.

(4) In the above-described embodiments the shield shell and the housing are integrated by an insert forming, but in the invention the shield shell may be installed on the housing which is already formed.

(5) In the above-described embodiments the shield shell and the connector are connected wherein the circumstance surfaces of the shield shell and the connector are opposed to each other, but in the invention a flange may be formed at the end of the shield shell and the end of the connector and the flanges may be abutted to each other to be connected.

(6) The above-described embodiments are applied to the lever connector, but the invention can be applied to other connectors that do not use a lever.

What is claimed is:

1. An end structure of shielded cable, comprising:
   a shielded cable including a wire surrounded by a shielding member made of a braided wire;
   a tubular fastener capable of being outer-fitted on the shielding member;
   a tubular metallic connector capable of being outer-fitted on an end portion of the wire; the tubular metallic connector including:
   a boss capable of clamping an end portion of the shielded member only between the tubular fastener and the tubular metallic connector in a state that the braided wire of the shielding member is extending toward the end of the shielding member in an axial direction of the shielded cable; and
   a connection part connected to a metallic shield shell capable of surrounding terminal hardware connected to the end portion of the wire in a housing of a shielded connector that connects to the shielded cable.

2. A shielded cable comprising:
   a wire surrounded by a shielding member;
   a tubular fastener capable of being outer-fitted on the shielding member made of a braided wire;
   a tubular metallic connector capable of being outer-fitted on an end portion of the wire; the connector including:
   a boss capable of clamping an end portion of the shielded member only between the tubular fastener and the shielded connector in a state that the braided wire of the shielding member is extending toward the end of the shielding member in an axial direction of the shielded cable; and
   a connection part connected to a metallic shield shell capable of surrounding terminal hardware connected to the end portion of the wire in a housing of the shielded connector.

3. A manufacturing method of a shielded wire harness when an end of a shielded cable in which a wire is surrounded by a shielding member is connected to a shielded connector, comprising:
   outer-fitting a tubular fastener onto a shielding member made of a braided wire;
   holding the tubular fastener in a rear portion of the shielding member;
   sliding a boss of a metallic tubular connector only between an end of the wire and an end of the shielding member in a state that a braided wire of the shielding member is extending toward the end of the shielding member in an axial direction of the shielded cable;
   moving the tubular fastener forward to clamp an end portion of the shielding member between the tubular fastener and the boss;
   connecting the terminal hardware to the end portion of the wire;
   inserting the terminal hardware into the housing of the shielded connector;

fitting the metallic tubular connector into the housing of the shielded connector; and connecting a connection part of the metallic tubular connector to a metal shield shell which surrounds the terminal hardware in a housing of the shielded connector.

4. The manufacturing method of the shielded wire harness according to claim 3, further comprising:

exposing the wire for a predetermined length from an end portion of the wire by removing the shielding member.

5. The manufacturing method of the shielded wire harness according to claim 4, comprising:

evacuating the connector to a rear portion of the shielding member while fitting the connector into the housing after clamping the end of the shielding member between the fastener and the boss of the connector.

6. The manufacturing method of the shielded wire harness according to claim 1, further comprising:

exposing the wire for a predetermined length from an end portion of the wire by deforming the shielding member to shrink in an axis direction before the end portion of the wire connects to the terminal hardware.

* * * * *